Nov. 5, 1957 V. A. MISEK 2,812,495
BALANCED MODULATOR
Filed Jan. 18, 1955

Victor A. Misek
INVENTOR.
BY
Attorney 2,812,495

BALANCED MODULATOR

Victor A. Misek, Nashua, N. H., assignor, by mesne assignments, to Sanders Associates, Inc., Nashua, N. H., a corporation of Delaware Application January 18, 1955, Serial No. 482,553

6 Claims. (Cl. 332—9)

Figure 1:
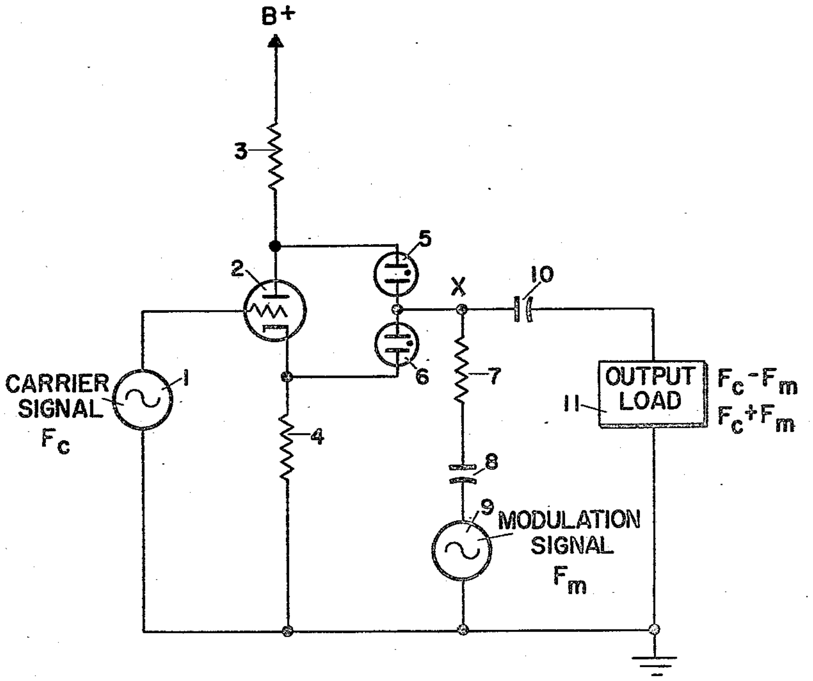

This invention relates to modulation devices. More particularly, the present invention relates to balanced modulators such as are used to produce suppressed carrier modulation.

In the prior art many devices have been proposed for developing amplitude modulated carrier waves wherein only the sideband frequencies, carrying the information, appear in the output and the original carrier signal is substantially eliminated (suppressed). These devices are ordinarily characterized by a relatively complex structure and design in that a number of unilateral impedance devices are required. It is, therefore, an object of the invention to provide an improved balanced modulator utilizing bistable impedance means to produce suppressed carrier modulation.

It is another object of the present invention to provide an improved balanced modulator utilizing bilateral variable impedance means to provide suppressed carrier modulation.

A further object of the present invention is to provide an improved balanced modulator utilizing diode gas discharge electron tubes to provide suppressed carrier modulation.

A still further object of the invention is to provide an improved balanced modulator which is economical in its construction and inherently stable in its operation.

Other and further objects of the invention will be apparent from the following description of a preferred embodiment thereof, taken in connection with the accompanying drawings.

In accordance with the present invention, there is provided a suppressed carrier modulation device comprising a source of direct voltage and a pair of series-connected, bistable impedance means. The impedance means are characterized by a normally high impedance and, upon the application of a predetermined voltage thereacross, a substantially decreased, low impedance. The impedance means are connected in series with the voltage source. Modulation means, for producing a modulation signal, is connected in parallel with one of the impedance means and has an intermediate impedance substantially greater than the above-mentioned low impedance. Bi-stable switching impedance means is connected in parallel with the above-mentioned pair of impedance means and in series with the voltage source to control the application of the direct voltage across the pair of impedance means. A separate source of carrier signal is coupled to the switching means and has frequencies greater than the modulation signals for controlling the operation of the switching means. Output load means are connected in parallel with the modulation means to provide an output signal characterized by frequencies consisting of the sum of the carrier and modulation frequencies and the difference between the carrier and modulation frequencies.

In a preferred embodiment of the invention there is provided a suppressed carrier modulation device comprising a source of alternating carrier signal and a source of alternating modulation signal. The modulation signal is characterized by a lesser frequency than the carrier signal. A triode vacuum electron tube having a cathode, a control grid and a plate is provided, the grid being connected to the source of the carrier signal. The device includes a source of unidirectional voltage. A plate impedance means connects the plate in series with the source of unidirectional voltage. A cathode impedance means connects the cathode in series with the source of unidirectional voltage. A pair of series connected diode gas discharge electron tubes is connected in parallel with the triode. A capacitor is connected to the source of the modulation signal. Modulation impedance means connect the capacitor and the junction between the diodes. An output load means is provided. A capacitor connects the output load means to the junction between the diodes and the modulation impedance means to provide an output signal characterized by frequencies consisting of the sum of the carrier and modulation frequencies and the difference between the carrier and modulation frequencies.

Figure 2:
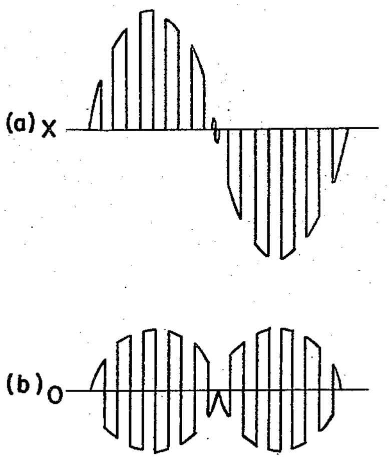

In the accompanying drawings, Fig. 1 is a schematic circuit diagram of a preferred embodiment of the present invention; and Fig. 2 presents graphs of wave forms associated with the operation of the present invention.

Referring now to the drawings, and with particular reference to Fig. 1, a carrier means, here shown as a carrier signal generator 1 provides an alternating carrier signal $F_c$, and is connected between the grid of a bistable switching impedance means (triode vacuum electron tube 2) and ground. The triode plate is connected to a plate impedance means (load resistor 3) which is connected in series with a source of unidirectional voltage (a relatively high positive voltage labeled B+). The cathode is connected to ground through a cathode impedance means (load resistor 4). In the preferred embodiment the resistors 3 and 4 are equal. A pair of bilateral variable impedance means (diode gas discharge electron tubes 5 and 6) are connected in series with each other and in parallel with the tube 2, as shown. As is well known in the art, diode gas discharge tubes are characteristically bistable; i. e. at least two stable operating impedance conditions are exhibited. Normally a gas tube is non-conductive and has a high impedance. Upon the application of a predetermined voltage, the tube fires and has a substantially decreased, low impedance. The term "bilateral impedance" herein implies non-polarity sensitive conduction characteristics; i. e., conducts current in either direction with equal facility. A modulation means, here shown as a modulation signal generator 9, provides a modulation signal $F_m$. A capacitor 8 couples the generator 9 through an impedance means (a resistor 7) to a junction point X between the diodes 5 and 6. In the preferred embodiment the resistance of the resistor 7 is much greater than that of the resistors 3 and 4. A capacitor 10 couples the junction point X to an output load 11 which is connected to ground as shown.

The switching means may comprise a transistor, a capacitor amplifier or a magnetic amplifier among numerous devices which may be used in the place of the triode 2. The bilateral impedance means may comprise such devices as thermistors, ferrite resistors, etc.

Referring now to Figs. 1 and 2, the operation of the invention will be described. The amplitude of the carrier signal $F_c$ is chosen such that the triode 2 is driven into saturation during the positive half cycles and into cutoff during the negative half cycles. When the tube 2 is conductive, its impedance drops to a very low value substantially providing a short-circuit across the diodes 5 and 6 to preclude them from conducting. Conversely, when the tube 2 is cut off its plate goes very positive with respect to ground, thus providing a bistable switching impedance means. The diodes 5 and 6 discharge and conduct current through resistors 3 and 4. It will be seen that triode 2 is a switching means controlling the application of the unidirectional voltage across the diodes 5 and 6. The direct voltage at the point X is half of the supply voltage since the resistors 3 and 4 and diodes 5 and 6 form a symmetrical voltage dividing circuit. The modulation signal provided by the generator 9 is coupled through capacitor 8 and resistor 7 to add to and subtract from the direct voltage appearing at the point X at a lesser frequency than that of the carrier signal $F_c$.

The modulation voltage is coupled through the capacitor 10 and appears across the output load 11. During the conduction cycle of the triode 2, the diodes 5 and 6 are open-circuited; hence, the voltage at the point X varies in accordance with the modulation signal $F_m$. When the tube 2 is cutoff, the diode 6 discharges and provides a relatively low impedance conduction path to the resistor 4. Since its resistance is relatively low compared to that of the resistor 7, the voltage at the point X remains substantially one-half the supply voltage.

The curve (*a*) of Fig. 2 is a graph of voltage wave forms at point X and illustrates the voltage pulses obtained by the effective switching action of the diode 6 at the frequency of the carrier signal. When the voltage at the point X is coupled through the capacitor 10, the direct voltage component is removed. The output signal appearing across the output load 11 alternates in polarity with respect to ground, as shown in the curve (*b*) of Fig. 2.

It is characteristic of the instant device that the input carrier signal $F_c$ and modulation signal $F_m$ are suppressed in the output of the device. Only the sideband frequencies, $F_c-F_m$ and $F_c+F_m$, appear in the output.

In an embodiment of the invention which was actually constructed and tested, a carrier signal amplitude of 70 volts (R. M. S.) was used at a frequency of 5,000 cycles. The resistors 3 and 4 were each 200,000 ohms. A type 6C4 was used for the triode 2; NE2 neon bulbs were used for the diodes 5 and 6. The resistor 7 was one megohm. The capacitor 8 was 0.1 microfarad; the capacitor 10 was 0.001 microfarad. The amplitude of the modulation signal was 5 volts (R. M. S.) at a frequency of 60 cycles. The supply voltage (B+) was 250 volts.

It will be apparent that the present invention greatly enhances the design and manufacture of balanced modulator devices.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A suppressed carrier modulation device comprising a source of alternating carrier signal; a source of alternating modulation signal having a lesser frequency than said carrier signal. a triode vacuum electron tube having a cathode, a control grid and a plate, said grid being connected to said source of carrier signal; a source of unidirectional voltage; a plate impedance means connecting said plate in series with said source of unidirectional voltage; a cathode impedance means connecting said cathode in series with said source of unidirectional voltage; a pair of series connected diode gas discharge electron tubes connected in parallel with said triode; a capacitor connected to said source of modulation signal; modulation impedance means connecting said capacitor and the junction between said diodes; output load means; and a capacitor connecting said output load means to the junction between said diodes and said modulation impedance means to provide an output signal characterized by frequencies consisting of the sum of the carrier and modulation frequencies and the difference between the carrier and modulation frequencies.

2. A suppressed carrier modulation device comprising a carrier means providing an alternating carrier signal; a modulation means providing a modulation signal having a lesser frequency than said carrier signal; a first bilateral variable impedance means, its impedance being substantially decreased upon the application of a predetermined voltage across said impedance means; a second bilateral variable impedance means, its impedance being substantially decreased upon the application of a predetermined voltage across said second impedance means; a source of unidirectional voltage; a triode vacuum electron tube, having a control grid connected to said carrier means and a plate and a cathode connected in series with said unidirectional voltage and in parallel with said impedance means, controlling the application of said voltage across said first and second impedance means in response to and at the frequency of said carrier signal, said impedance means being connected in parallel with said switching means between said modulation means and said switching means; and output load means connected to the junction between said impedance means and said modulation means to provide an output signal characterized by freequencies consisting of the sum of the carrier and modulation frequencies and the difference between the carrier and modulation frequencies.

3. A suppressed carrier modulation device comprising: a source of direct voltage; a pair of series-connected, bistable impedance means connected in series with said voltage source and characterized by a normally high impedance becoming a substantially decreased, low impedance upon the application of a predetermined voltage thereacross; modulation means, for providing a modulation signal, connected in parallel with one of said impedance means and having an intermediate impedance substantially greater than said low impedance; bistable switching impedance means connected in parallel with said pair of impedance means and in series with said voltage source to control the application of said direct voltage across said pair of impedance means; a separate source of carrier signal coupled to said switching means and having a frequency greater than said modulation signal for controlling the operation of said switching means; and output load means, connected in parallel with said modulation means, to provide an output signal characterized by frequencies consisting of the sum of the carrier and modulation frequencies and the difference between the carrier and modulation frequencies.

4. A suppressed carrier modulation device comprising: a source of direct voltage; a pair of series connected, diode gas discharge electron tubes connected in series with said voltage source and characterized by a normally high impedance becoming a substantially decreased low impedance upon the application of a predetermined voltage thereacross; modulation means, for providing a modulation signal, connected in parallel with one of said impedance means and having an intermediate impedance substantially greater than said low impedance; bistable switching impedance means connected in parallel with said pair of impedance means and in series with said voltage source to control the application of said direct voltage across said pair of impedance means; a separate source of carrier signal coupled to said switching means and having a frequency greater than said modulation signal for controlling the operation of said switching means; and output load means, connected in parallel with said modulation means, to provide an output signal characterized by frequencies consisting of the sum of the carrier and modulation frequencies and the difference between the carrier and modulation frequencies.

5. A suppressed carrier modulation device comprising: a source of direct voltage; a pair of series connected, bistable impedance means connected in series with said voltage source and characterized by a normally high impedance becoming a substantially decreased low impedance upon the application of a predetermined voltage thereacross; modulation means, for providing a modulation signal, connected in parallel with one of said impedance means and having an intermediate impedance substantially greater than said low impedance; an electron discharge tube, having a cathode, a control grid and an anode, connected in parallel with said pair of impedance means and in series with said voltage source to control the application of said direct voltage across said pair of impedance means; a separate source of carrier signal coupled to said switching means and having a frequency greater than said modulation signal for controlling the operation of said switching means; and output load means, connected in parallel with said modulation means, to provide an output signal characterized by frequencies consisting of the sum of the carrier and modulation frequencies and the difference between the carrier and modulation frequencies.

6. A suppressed carrier modulation device comprising: a source of direct voltage; a pair of series connected, bistable impedance means connected in series with said voltage source and characterized by a normally high impedance becoming a substantially decreased low impedance upon the application of a predetermined voltage thereacross; modulation means, for providing a modulation signal, connected in parallel with one of said impedance means and having an intermediate impedance substantially greater than said low impedance; bistable switching impedance means connected in parallel with said pair of impedance means and in series with said voltage source to control the application of said direct voltage across said pair of impedance means; a separate source of carrier signal having a frequency greater than said modulation signal for controlling the operation of said switching means; output load means; and capacitive coupling means connecting said load in parallel with said modulation means, to provide an output signal characterized by frequencies consisting of the sum of the carrier and modulation frequencies and the difference between the carrier and modulation frequencies.

References Cited in the file of this patent

UNITED STATES PATENTS

| | | |
|---|---|---|
| 1,684,445 | Honaman | Sept. 18, 1928 |
| 2,000,685 | Andrew | May 7, 1935 |
| 2,365,568 | Langer | Dec. 19, 1944 |